US007890298B2

(12) United States Patent
Coskun et al.

(10) Patent No.: US 7,890,298 B2
(45) Date of Patent: Feb. 15, 2011

(54) MANAGING THE PERFORMANCE OF A COMPUTER SYSTEM

(75) Inventors: Ayse K Coskun, La Jolla, CA (US); Kenny C Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 293 days.

(21) Appl. No.: 12/137,977

(22) Filed: Jun. 12, 2008

(65) Prior Publication Data
US 2009/0313623 A1    Dec. 17, 2009

(51) Int. Cl.
*G06F 9/46* (2006.01)
(52) U.S. Cl. ............... 702/186; 718/100; 718/102; 718/103; 718/108; 711/148; 711/151; 711/152; 711/153; 711/158; 713/300; 713/322; 713/324
(58) Field of Classification Search ............... 702/186; 718/100, 102, 103, 108; 711/148, 151, 152, 711/153, 158; 713/300, 322, 324
See application file for complete search history.

(56) References Cited

U.S. PATENT DOCUMENTS

| 3,818,459 | A | * | 6/1974 | Vrablik .................. 711/219 |
| 5,826,079 | A | * | 10/1998 | Boland et al. ............... 718/102 |
| 5,826,081 | A | * | 10/1998 | Zolnowsky .................. 718/103 |
| 5,991,708 | A | * | 11/1999 | Levine et al. ............... 702/186 |
| 6,269,390 | B1 | * | 7/2001 | Boland .................. 718/100 |
| 6,289,369 | B1 | * | 9/2001 | Sundaresan .................. 718/103 |
| 6,650,779 | B2 | * | 11/2003 | Vachtesvanos et al. ...... 382/228 |
| 6,728,959 | B1 | * | 4/2004 | Merkey .................. 718/102 |
| 6,874,105 | B2 | * | 3/2005 | Buechner et al. ............... 714/39 |
| 7,107,593 | B2 | * | 9/2006 | Jones et al. ............... 718/103 |
| 7,318,128 | B1 | * | 1/2008 | Dice .................. 711/151 |
| 7,346,787 | B2 | * | 3/2008 | Vaidya et al. ............... 713/300 |
| 7,665,089 | B1 | * | 2/2010 | Vengerov .................. 718/102 |
| 2004/0215987 | A1 | * | 10/2004 | Farkas et al. ............... 713/300 |
| 2009/0089792 | A1 | * | 4/2009 | Johnson et al. ............. 718/105 |

* cited by examiner

*Primary Examiner*—Carol S Tsai
(74) *Attorney, Agent, or Firm*—Park, Vaughan, Fleming & Dowler LLP

(57) ABSTRACT

Some embodiments of the present invention provide a system that manages a performance of a computer system. During operation, a current expert policy in a set of expert policies is executed, wherein the expert policy manages one or more aspects of the performance of the computer system. Next, a set of performance parameters of the computer system is monitored during execution of the current expert policy. Then, a next expert policy in the set of expert policies is dynamically selected to manage the performance of the computer system, wherein the next expert policy is selected based on the monitored set of performance parameters to improve an operational metric of the computer system.

18 Claims, 3 Drawing Sheets

MANAGING THE PERFORMANCE OF A COMPUTER SYSTEM

BACKGROUND

1. Field

The present invention relates to techniques for enhancing the performance of computer systems. More specifically, the present invention relates to a method and apparatus for managing the performance of a computer system.

2. Related Art

As the power consumption of semiconductor chips has increased significantly due to technology scaling, design trends have shifted toward building multiprocessor system-on-chips (MPSoCs). MPSoCs are able to provide higher throughput per watt and can also support thread-level parallelism, which brings opportunities to reduce power consumption and manage temperature more efficiently. Thermal hot spots and high temperature gradients are among the major challenges in MPSoC design, since they can degrade reliability, increase the load average and cooling costs, and complicate circuit design. Note that load average is one metric to evaluate system response time, and a lower load average indicates a faster system.

More specifically, thermal hot spots can increase cooling costs while potentially accelerating failure mechanisms such as electromigration, stress migration, and dielectric breakdown, which can cause permanent device failures. Increased temperatures can also affect the load average, since the effective operating speed of devices decreases with higher temperatures. For these reasons, expert policies for computer systems, such as conventional dynamic thermal management (DTM) techniques, generally focus on keeping the temperature below a critical threshold to prevent hot spots. Examples of conventional DTM techniques are clock gating, voltage/frequency scaling, thread migration, and applying proportional-integral-derivative (PID) control to maintain safe and stable temperatures. These techniques can prevent thermal hot spots but typically involve a considerable increase in the load average.

Moreover, since DTM techniques do not focus on balancing the temperature across the chip, they can create large spatial gradients in temperature. These spatial gradients can lead to an increase in the load average, accelerate logic failures, decrease the efficiency of cooling, and in some cases, cause reliability issues.

Another issue with expert policies, such as the DTM or dynamic power management (DPM) methods, is that they do not prevent thermal cycling, or they sometimes exacerbate thermal cycling. High magnitude and frequency thermal cycles (i.e., temporal fluctuations) can cause package fatigue and plastic deformations, and can lead to permanent failures. In addition to low-frequency power changes (i.e., system power on/off), cycles are created by workload rate changes and power management decisions. Note that thermal cycling can be especially accelerated by DPM methods that turn off cores, because in the sleep state, cores have significantly lower temperature than the active state.

Some of the foregoing reliability challenges have been addressed by expert policies that optimize power management decisions for a given reliability constraint. Unfortunately, existing DTM methods typically cannot guarantee effectiveness for all execution periods, because the trade-off between temperature and load average can vary markedly between different types of workloads.

Many expert policies used in the computing industry today have specific optimization goals and, as such, their advantages vary in terms of saving power, achieving better temperature profiles or decreasing the load average. For example, DPM can reduce thermal hot spots while saving power. However, when there is an increased workload arrival rate, typical DPM schemes significantly increase thermal cycling and cannot effectively optimize power, reliability, and load average under dynamically varying workload profiles.

Hence, what is needed is a method and apparatus for managing the performance of a computer system without the problems described above

SUMMARY

Some embodiments of the present invention provide a system that manages a performance of a computer system. During operation, a current expert policy in a set of expert policies is executed, wherein the current expert policy manages one or more aspects of the performance of the computer system. Next, a set of performance parameters of the computer system is monitored during execution of the current expert policy. Then, a next expert policy in the set of expert policies is dynamically selected to manage the performance of the computer system, wherein the next expert policy is selected based on the monitored set of performance parameters to improve an operational metric of the computer system.

In some embodiments, monitoring the set of performance parameters of the computer system includes systematically monitoring and recording a set of performance parameters of the computer system, wherein the recording process keeps track of the temporal relationships between events in different performance parameters.

In some embodiments, dynamically selecting the next expert policy includes selecting a specialist from a set of specialists based on the set of performance parameters, wherein each specialist is associated with at least one expert policy in the set of expert policies, and wherein a specialist in the set of specialists may be associated with different expert policies based on performance parameters in the set of performance parameters.

In some embodiments, at least two specialists in the set of specialists are associated with the same expert policy.

In some embodiments, dynamically selecting the next expert policy includes dynamically selecting the next expert policy based on a loss function, wherein the loss function is based on performance parameters in the set of performance parameters.

Some embodiments further include generating a set of metrics based on the set of performance parameters, wherein the set of metrics is related to one or more of: a hot spot metric, a thermal cycle metric, a spatial gradient metric, and a load average metric. The loss function is determined based on metrics in the set of metrics, wherein determining the loss function includes calculating an updated loss function for the one or more specialists associated with the current expert policy.

In some embodiments, dynamically selecting the next expert policy includes using an online learning technique.

In some embodiments, the online learning technique includes a switching experts framework.

In some embodiments, the operational metric includes at least one of: a computer system load average, a computer system reliability, and a computer system energy efficiency.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
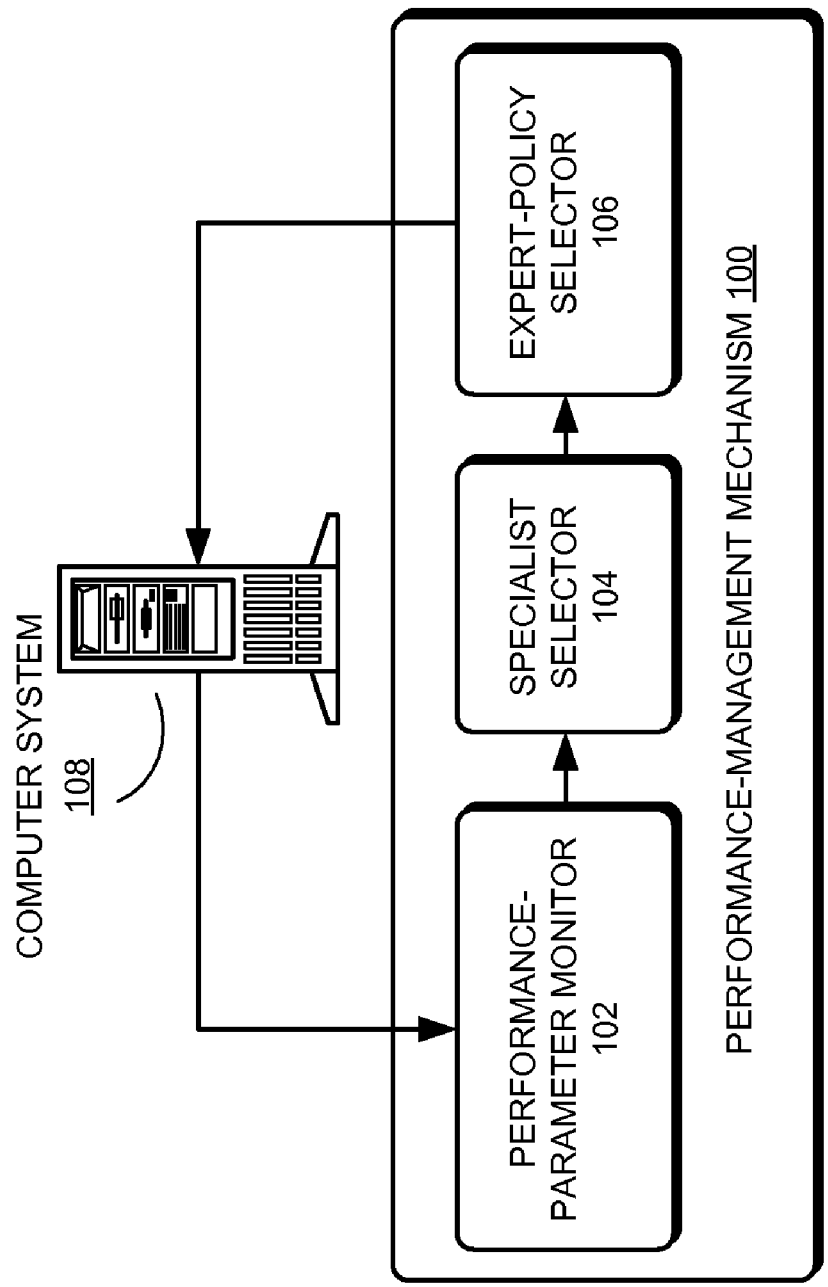
FIG. 1 represents a system that manages the performance of a computer system in accordance with some embodiments of the present invention.

FIG. 1 represents a system that manages the performance of a computer system in accordance with some embodiments of the present invention. Performance-management mechanism 100 includes performance-parameter monitor 102, specialist selector 104, and expert-policy selector 106. Performance-parameter monitor 102 is coupled to specialist selector 104, and specialist selector 104 is coupled to expert-policy selector 106. Computer system 108 is coupled to performance-parameter monitor 102 and expert-policy selector 106.

Computer system 108 can include but is not limited to a server, server blade, a datacenter server, an enterprise computer, a field-replaceable unit that includes a processor, or any other computation system that includes one or more processors and one or more cores in each processor.

Performance-parameter monitor 102 can be any device that can monitor performance parameters of computer system 108, including but not limited to: temperatures, thermal cycles, spatial gradients, currents, voltages and fan speeds, loads, processor frequency, throughput variables, transaction latencies, time series of any performance parameter, and performance parameters for each processor and core in computer system 108. Performance parameters can also include but are not limited to performance parameters as set forth in U.S. Pat. No. 7,020,802, entitled "Method and Apparatus for Monitoring and Recording Computer System Performance Parameters," by Kenny C. Gross and Larry G. Votta, Jr., issued on Mar. 28, 2006, which is hereby fully incorporated by reference.

Performance-parameter monitor 102 can be implemented in any combination of hardware and software. In some embodiments, performance-parameter monitor 102 operates on computer system 108. In other embodiments, performance-parameter monitor 102 operates on one or more service processors. In still other embodiments, performance-parameter monitor 102 is located inside computer system 108. In yet other embodiments, performance-parameter monitor 102 operates on a separate computer system. In some embodiments, performance-parameter monitor 102 includes a method or apparatus for monitoring and recording computer system performance parameters as set forth in U.S. Pat. No. 7,020,802.

Specialist selector 104 can be any device that can receive input from performance-parameter monitor 102 and select a specialist. Specialists will be described in more detail below with reference to FIG. 2. Specialist selector 104 can be implemented in any combination of hardware and software. In some embodiments, specialist selector 104 operates on computer system 108. In other embodiments, specialist selector 104 operates on one or more service processors. In still other embodiments, specialist selector 104 is located inside computer system 108. In yet other embodiments, specialist selector 104 operates on a separate computer system. In other embodiments specialist selector 104 operates on the same hardware as performance-parameter monitor 102.

Expert-policy selector 106 can be any device that can receive input from specialist selector 104 and select an expert policy for computer system 108. Expert policies will be described in more detail below with reference to FIG. 2. Expert-policy selector 106 can be implemented in any combination of hardware and software. In some embodiments, expert-policy selector 106 operates on computer system 108. In other embodiments, expert-policy selector 106 operates on one or more service processors. In still other embodiments, expert-policy selector 106 is located inside computer system 108. In yet other embodiments, expert-policy selector 106 operates on a separate computer system. In other embodiments, expert-policy selector 106 operates on the same hardware as performance-parameter monitor 102, and/or specialist selector 104.

Some embodiments of the present invention generally work as follows. During operation of computer system 108, suppose a current expert policy is operating on computer system 108. While the current expert policy is being executed, performance-parameter monitor 102 monitors performance parameters from computer system 108. Then, after a predetermined time period, specialist selector 104 selects a specialist based on predetermined metrics using the monitored performance parameters. Expert-policy selector 106 then selects one or more expert policies for computer system 108 based on the selected specialist. In some embodiments, performance-management mechanism 100 implements online learning techniques to select the one or more expert policies to operate on computer system 108 based on the performance parameters. In some embodiments, the online learning techniques can include but are not limited to a "switching experts" technique as described in Y. Freund, R. E. Schapire, Y. Singer, and M. K. Warmuth. "Using and Combining Predictors that Specialize," In ACM Symposium on Theory of Computing (STOC), pages 334-343, 1997, which is hereby fully incorporated by reference.

Figure 2A:
FIG. 2A presents a chart depicting a set of expert policies for a computer system in accordance with some embodiments of the present invention.
Figure 2B:
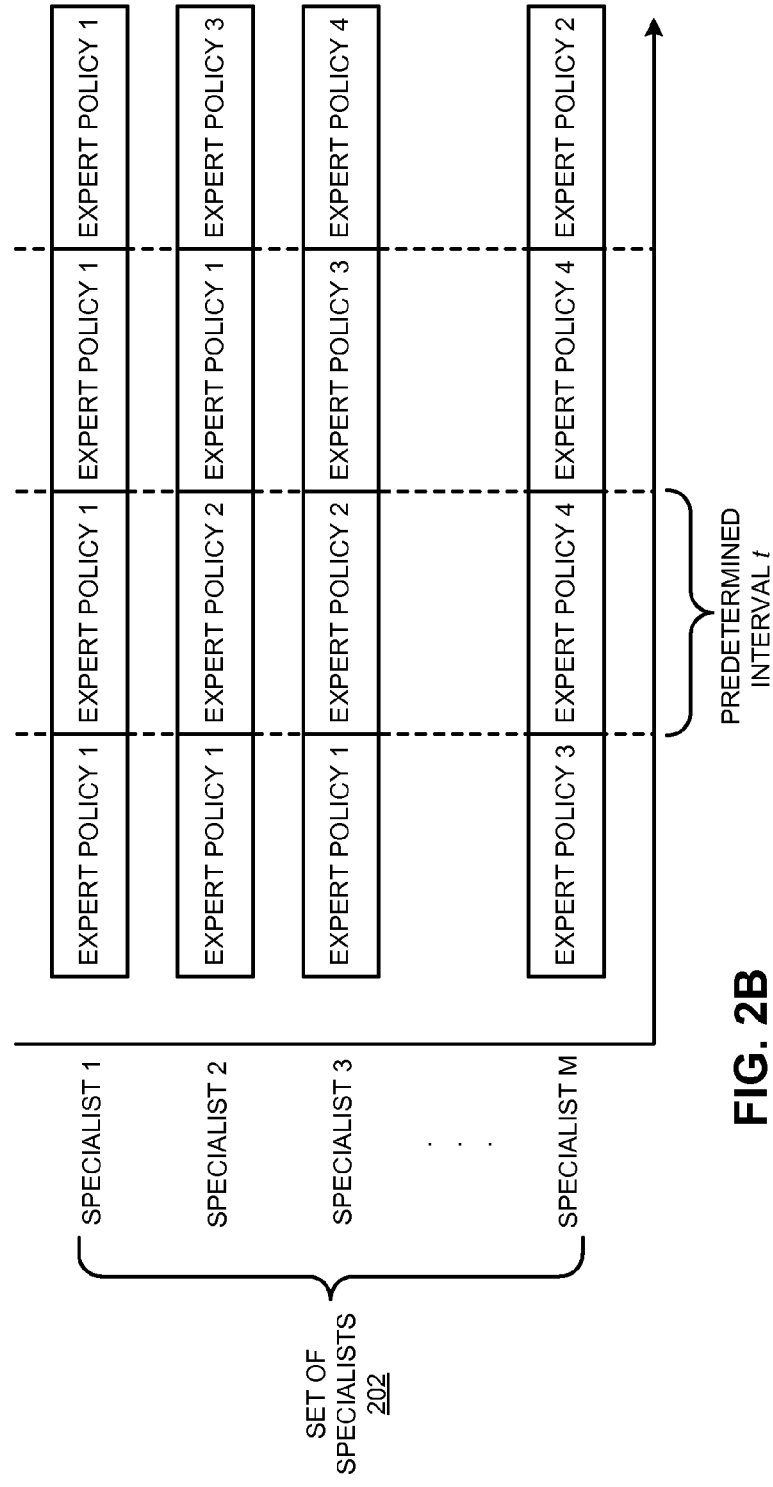
FIG. 2B presents a chart depicting a set of specialists and expert policy selections over time for a computer system in accordance with some embodiments of the present invention.

FIGS. 2A and 2B depict expert policies and specialists in more detail in accordance with some embodiments of the invention. FIG. 2A presents a chart depicting set of expert policies 200 for computer system 108 in accordance with some embodiments of the present invention. Expert policies can include but are not limited to dynamic power management (DPM), dynamic thermal management (DTM), dynamic voltage scaling (DVS), thread migration, load balancing, adaptive-random scheduling, combinations of individual expert policies, and expert policies selected based on performance parameters. The adaptive-random scheduling expert policy is described in a U.S. patent application entitled "Workload Scheduling in Multi-Core Processors," by Ayse K. Coskun, Aleksey M. Urmanov, Kenny C. Gross, and Keith A. Whisnant, application Ser. No. 12/109,572, filed Apr. 25, 2008, which is hereby fully incorporated by reference.

FIG. 2B presents a chart depicting set of specialists 202 and specialist selections 204 of expert policies over time for computer system 108 in accordance with some embodiments of the present invention. It is noted that each specialist in set of specialists 202 is configured to select a predetermined expert policy from set of expert policies 200 to execute on computer system 108. The predetermined expert policy selected by a specialist can be based on performance parameters of computer system 108. For example, in FIG. 2B, specialist selections 204 show that while specialist 1 selects expert policy 1 for all four predetermined time periods depicted, each of the other specialists depicted selects different expert policies over the course of the four predetermined time periods depicted.

Embodiments of the present invention will now be described with reference to embodiments of specialist selector 104 and expert-policy selector 106. During operation of computer system 108, a current expert policy is operating on computer system 108. While the current expert policy is operating, performance-parameter monitor 102 monitors performance parameters from computer system 108. Then, after a predetermined time period, a weight factor is determined by specialist selector 104 for each specialist based on the monitored performance parameters. The specialist for the next predetermined time period is selected by specialist selector 104 based on the weight factors for each specialist. The selected specialist is then used by expert-policy selector 106 to select a next expert policy for the next predetermined time period for computer system 108.

In some embodiments, the weight factors for the specialists are determined by first evaluating a loss function. The loss function for the predetermined time period is based on performance parameters measured by performance-parameter monitor 102 during the current time period and is related to how well the currently active expert policy has performed in terms of predetermined metrics over the predetermined time period.

Table 1 depicts a sample loss function that includes four categories: hot spots, thermal cycles, spatial gradients, and load average. Each category for the loss function is related to a metric for the performance of the computer system through the amount of loss. Each metric for the performance of the computer system is further related to operational metrics for computer system 108 such as computer system load average, reliability, and energy efficiency. In some embodiments of the invention, the loss function includes fewer or more metrics, and additional metrics can be used that are related to the same or other operational metrics for computer system 108. It is noted that the loss function can be modified to emphasize or de-emphasize any metric or related operational metric by changing the weighting for one or more metrics in the loss function. In some embodiments, the terms in the loss function can be weighed equally or differently, depending on the user demands. For example, for systems for which a higher thread execution rate is required, the load average term in the loss functioned can be assigned a higher weigh than the temperature-related terms.

TABLE 1

SAMPLE LOSS FUNCTION FOR SOME EMBODIMENTS

| Category | Amount of Loss |
|---|---|
| Hot Spots | If $t_{HS} > 0$: $t_{HS}$ Otherwise: 0 |
| Thermal Cycles | If $t_{TC} > 0$: $t_{TC}$ Otherwise: 0 |
| Spatial Gradients | If $t_{SP} > 0$: $t_{SP}$ Otherwise: 0 |
| Load Average | If $LA_{cur} > LA_{thr}$: $LA_{cur} > LA_{thr}$ Otherwise: 0 |

Referring to Table 1, for hot spots, the loss function is related to the amount of time $t_{HS}$, during the predetermined time period that a temperature of a core in computer system 108 has spent above a threshold temperature. For thermal cycles, the loss function is related to the amount of time $t_{TC}$, during the predetermined time period that there are temperature cycles larger than a predetermined temperature amplitude on each core in computer system 108. For spatial gradients, the loss function is related to the amount of time $t_{SG}$, during the predetermined time period that there is a spatial temperature gradient larger than a predetermined spatial gradient on a core in computer system 108. For load average, the loss function is related to the amount by which the load average during the predetermined time period ($LA_{cur}$) exceeds a threshold load average ($LA_{thr}$). The load average is the sum of a run queue length and number of jobs currently running on computer system 108. The total loss function $L_t$ is then computed by normalizing each term of the loss function and then summing the contribution from each category over the predetermined time period.

The total loss function for the predetermined time period is then used by specialist selector 104 to determine a weight, $w_i$, for each specialist. In some embodiments, the weight for each specialist is determined using the total loss according to equation 1, in which n is a constant learning rate, $w_i^{CUR}$, is the weight for the $i^{th}$ specialist for the current predetermined time period and $w_i^{NEXT}$ is the weight for the $i^{th}$ specialist for the next predetermined time period.

$$\begin{cases} w_i^{NEXT} = w_i^{CUR} e^{-n/L_t} & \text{active specialist} \\ w_i^{NEXT} = w_i^{CUR} & \text{otherwise} \end{cases} \quad (1)$$

Active specialists are those specialists associated with the one or more current expert policies. For example with reference to FIG. 2B, during predetermined interval t, if the current expert policy is expert policy 2, then specialist 2 and specialist 3 are active specialists while specialist 1 and specialist M are not active.

TABLE 2

SET OF SPECIALISTS AND ASSOCIATED EXPERT POLICIES

| Specialist | Associated Expert Policy Definition |
|---|---|
| Random | Run a Randomly Selected Expert Policy |
| Utilization Based | High Util.: Run Thread Migration Medium Util.: Run Adaptive-Random Scheduling Medium-Low Util.: Run DVS & DPM Low Util.: Run DPM |

TABLE 2-continued

SET OF SPECIALISTS AND ASSOCIATED EXPERT POLICIES

| Specialist | Associated Expert Policy Definition |
|---|---|
| Temperature Based | If Hot Spot or Thermal Variations: Run Adaptive-Random Scheduling Otherwise: Run Default Policy |
| DVS & DPM | Always Run DVS & DPM |
| DPM | Always Run DPM |
| Thread Migration | Always Run Thread Migration |
| Adaptive-Random | Always Run Adaptive-Random Scheduling |
| Default | Always Run Default Policy |

Specialist selector 104 then selects the specialist with the highest weight. Expert-policy selector 106 then determines the one or more expert policies for computer system 108 based on the selected specialist. The one or more expert policies become the current one or more expert policies for the next predetermined time period. Table 2 depicts a sample set of specialists and the expert policies associated with each specialist in accordance with some embodiments of the invention.

From Table 2 it can be seen that the utilization-based specialist and the temperature-based specialist select their experts based on predefined performance-parameter-based metrics. For example, the utilization-based specialist selects which expert to run based on the utilization monitored by performance-parameter monitor 102 over the predetermined time period. The utilization is then classified as being within a predetermined high, medium, medium-low, or low category of utilization, and then the one or more expert policies are selected as depicted in Table 2. The predefined performance-parameter-based metrics can be determined empirically based on testing.

The random specialist randomly selects an expert policy to run. Each of the remaining specialists always runs the same one or more expert policies independently of performance parameters monitored during the predetermined time period. In particular, the DPM expert policy turns off idle cores based on a fixed timeout strategy. The DVS expert policy applies a dynamic voltage and frequency scaling policy that changes the voltage and frequency for a core based on the utilization on each core during the predetermined time period. The thread migration expert policy moves threads from cores with a higher temperature to cores with a lower temperature when a predetermined temperature is exceeded. The default policy is a load-average-oriented policy that attempts to allocate threads to the same core on which they ran previously, and load balancing is performed if there is congestion on a core.

Figure 3:
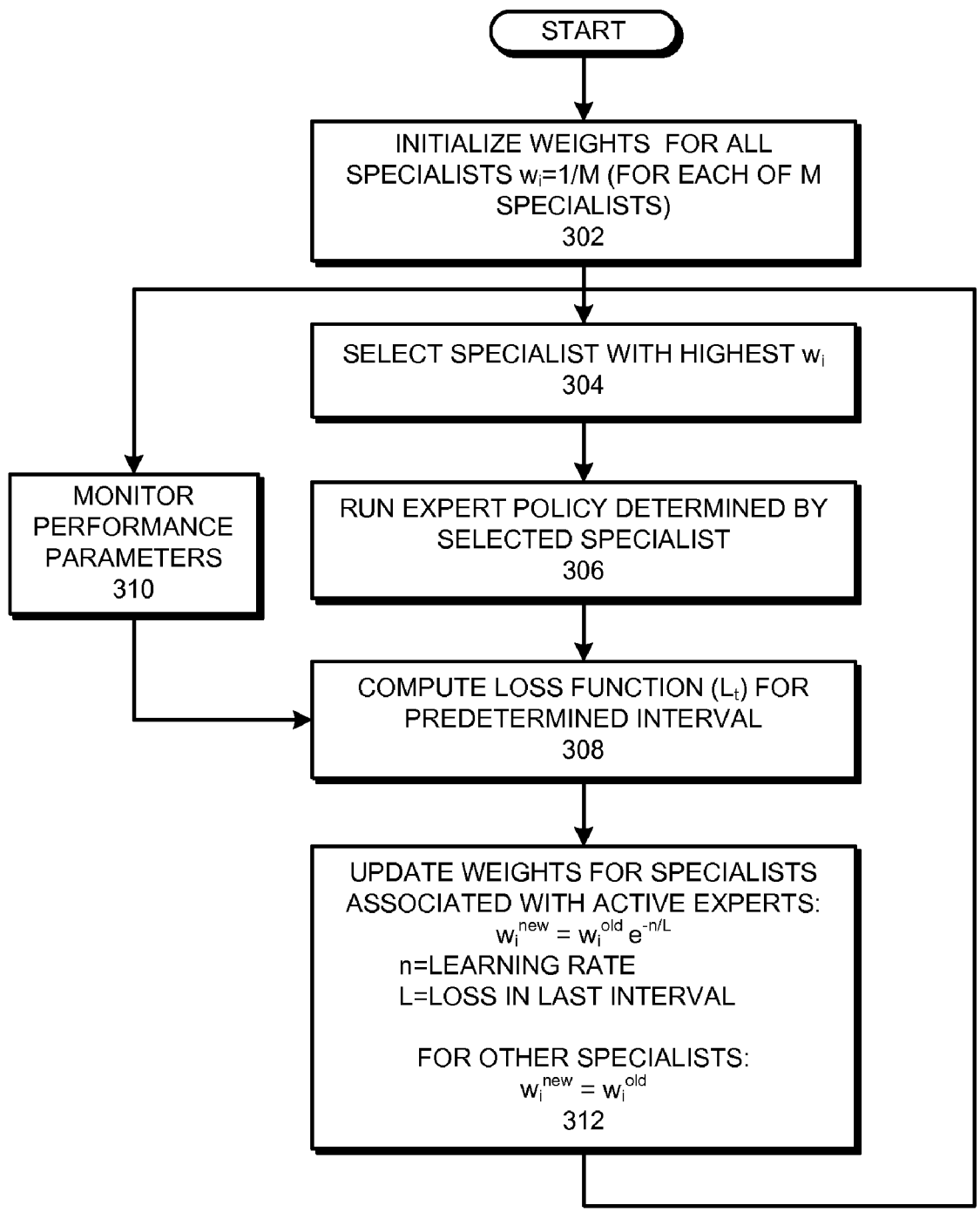
FIG. 3 presents a flowchart illustrating a process for managing the performance of a computer system in accordance with some embodiments of the present invention.

FIG. 3 presents a flowchart illustrating a process for managing the performance of a computer system in accordance with some embodiments of the present invention. First, the weights for all of the specialists are initialized to be equal to one over the number of specialists (step 302). Then, the specialist with the highest weight, $w_i$, is selected (step 304). The expert policy as determined by the selected specialist is then run on the computer system (step 306). Then, after a predetermined time period, the total loss function, $L_t$, for the predetermined time period is computed (step 308) using performance parameters monitored from the computer system (step 310). The weights for the specialists are then updated (step 312). In some embodiments, the weights are updated using equation 1. The process then returns to step 304 and step 310.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for managing a performance of a computer system, comprising:
   executing a current expert policy in a set of expert policies that manage one or more aspects of the performance of the computer system;
   monitoring a set of performance parameters of the computer system during execution of the current expert policy; and
   using a loss function to dynamically select a next expert policy in the set of expert policies to manage the performance of the computer system, wherein the next expert policy is selected based on the monitored set of performance parameters to improve an operational metric of the computer system; and
   wherein the loss function is based on performance parameters in the set of performance parameters.

2. The method of claim 1,
   wherein monitoring the set of performance parameters of the computer system includes systematically monitoring and recording a set of performance parameters of the computer system; and
   wherein the recording process keeps track of the temporal relationships between events in different performance parameters.

3. The method of claim 1,
   wherein dynamically selecting the next expert policy includes selecting a specialist from a set of specialists based on the set of performance parameters, wherein each specialist is associated with at least one expert policy in the set of expert policies; and
   wherein a specialist in the set of specialists may be associated with different expert policies based on performance parameters in the set of performance parameters.

4. The method of claim 3, wherein at least two specialists in the set of specialists are associated with the same expert policy.

5. The method of claim 1, further including:
   generating a set of metrics based on the set of performance parameters, wherein the set of metrics is related to one or more of: a hot spot metric, a thermal cycle metric, a spatial gradient metric, and a load average metric; and
   determining the loss function based on metrics in the set of metrics, wherein determining the loss function includes calculating an updated loss function for the one or more specialists associated with the current expert policy.

6. The method of claim 1, wherein dynamically selecting the next expert policy includes using an online learning technique.

7. The method of claim 6, wherein the online learning technique includes a switching experts framework.

8. The method of claim 1, wherein the operational metric includes at least one of: a computer system load average, a computer system reliability, and a computer system energy efficiency.

9. A non-transitory computer-readable storage medium storing instructions that when executed by a computer cause the computer to perform a method for managing a performance of a computer system, the method comprising:
   executing a current expert policy in a set of expert policies that manage one or more aspects of the performance of the computer system;

monitoring a set of performance parameters of the computer system during execution of the current expert policy; and using a loss function to dynamically select a next expert policy in the set of expert policies to manage the performance of the computer system, wherein the next expert policy is selected based on the monitored set of performance parameters to improve an operational metric of the computer system; and wherein the loss function is based on performance parameters in the set of performance parameters.

10. The computer-readable storage medium of claim 9, wherein monitoring the set of performance parameters of the computer system includes systematically monitoring and recording a set of performance parameters of the computer system; and wherein the recording process keeps track of the temporal relationships between events in different performance parameters.

11. The computer-readable storage medium of claim 9, wherein dynamically selecting the next expert policy includes selecting a specialist from a set of specialists based on the set of performance parameters, wherein each specialist is associated with at least one expert policy in the set of expert policies; and wherein a specialist in the set of specialists may be associated with different expert policies based on performance parameters in the set of performance parameters.

12. The computer-readable storage medium of claim 11, wherein at least two specialists in the set of specialists are associated with the same expert policy.

13. The computer-readable storage medium of claim 9, further including:

generating a set of metrics based on the set of performance parameters, wherein the set of metrics is related to one or more of: a hot spot metric, a thermal cycle metric, a spatial gradient metric, and a load average metric; and determining the loss function based on metrics in the set of metrics, wherein determining the loss function includes calculating an updated loss function for the one or more specialists associated with the current expert policy.

14. The computer-readable storage medium of claim 9, wherein dynamically selecting the next expert policy includes using an online learning technique.

15. The computer-readable storage medium of claim 14, wherein the online learning technique includes a switching experts framework.

16. The computer-readable storage medium of claim 9, wherein the operational metric includes at least one of: a computer system load average, a computer system reliability, and a computer system energy efficiency.

17. An apparatus for managing a performance of a computer system, comprising:

an execution mechanism configured to execute a current expert policy in a set of expert policies that manage one or more aspects of the performance of the computer system;

a monitoring mechanism configured to monitor a set of performance parameters of the computer system during execution of the current expert policy; and a dynamic selecting mechanism configured to use a loss function to dynamically select a next expert policy in the set of expert policies to manage the performance of the computer system, wherein the next expert policy is selected based on the monitored set of performance parameters to improve an operational metric of the computer system; and wherein the loss function is based on performance parameters in the set of performance parameters.

18. The apparatus of claim 17, wherein the monitoring mechanism includes a mechanism configured to systematically monitor and record the set of performance parameters of the computer system; and wherein the recording process keeps track of the temporal relationships between events in different performance parameters.

* * * * *